(12) United States Patent
Westerman

(10) Patent No.: US 6,510,242 B1
(45) Date of Patent: Jan. 21, 2003

(54) COLOR IMAGE ENHANCEMENT DURING YCBCR TO RGB COLOR CONVERSION

(75) Inventor: Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/427,498

(22) Filed: Oct. 26, 1999

(51) Int. Cl.[7] .............................................. G06K 9/00
(52) U.S. Cl. ....................................... 382/162; 382/167
(58) Field of Search ................................. 382/162, 166, 382/167, 274; 358/518, 520; 348/630, 631, 713

(56) References Cited

U.S. PATENT DOCUMENTS

| | | |
|---|---|---|
| 4,918,528 A | 4/1990 | Oohashi |
| 5,414,473 A | 5/1995 | Hong |
| 5,457,546 A | 10/1995 | Hong |
| 5,469,225 A | 11/1995 | Hong |
| 5,515,112 A * | 5/1996 | Penney ...................... 348/630 |
| 5,699,126 A | 12/1997 | Hong |
| 5,777,689 A | 7/1998 | Dunbar |
| 5,825,938 A | 10/1998 | De Lange |
| 5,883,984 A | 3/1999 | Huang et al. |
| 5,936,682 A | 8/1999 | Thomas et al. |

OTHER PUBLICATIONS

"A study of scene structure in the saturation component of color images," by Bruce A. Thomas, et al., 0–8194–2031–X/96, SPIE vol. 2657, pp. 32–41.

* cited by examiner

Primary Examiner—Phuoc Tran
(74) Attorney, Agent, or Firm—Marger Johnson & McCollom, PC

(57) ABSTRACT

A method is provided for upsampling a received YCbCr signal. The method generates the missing chrominance coefficients for each individual pixel, with a view to converting the data in the RGB color space. The method takes into account the values of the chrominance coefficients actually received for a neighboring pixel, the values of the luminance of the pixel, and of the saturation value for chrominance coefficients, as dictated by the RGB boundaries at that value of the luminance of the pixel.

26 Claims, 5 Drawing Sheets

| | 0 | 1 | 2 | 3 | 4 | 5 | ... |
|---|---|---|---|---|---|---|---|
| 0 | $Y_{0,0}$ $Cb_{0,0}$ $Cr_{0,0}$ | $Y_{0,1}$ $Cb_{0,1}$ $Cr_{0,1}$ | $Y_{0,2}$ $Cb_{0,2}$ $Cr_{0,2}$ | $Y_{0,3}$ $Cb_{0,3}$ $Cr_{0,3}$ | $Y_{0,4}$ $Cb_{0,4}$ $Cr_{0,4}$ | $Y_{0,5}$ $Cb_{0,5}$ $Cr_{0,5}$ | ... |
| 1 | $Y_{1,0}$ $Cb_{1,0}$ $Cr_{1,0}$ | $Y_{1,1}$ $Cb_{1,1}$ $Cr_{1,1}$ | $Y_{1,2}$ $Cb_{1,2}$ $Cr_{1,2}$ | $Y_{1,3}$ $Cb_{1,3}$ $Cr_{1,3}$ | $Y_{1,4}$ $Cb_{1,4}$ $Cr_{1,4}$ | $Y_{1,5}$ $Cb_{1,5}$ $Cr_{1,5}$ | ... |
| 2 | $Y_{2,0}$ $Cb_{2,0}$ $Cr_{2,0}$ | $Y_{2,1}$ $Cb_{2,1}$ $Cr_{2,1}$ | $Y_{2,2}$ $Cb_{2,2}$ $Cr_{2,2}$ | $Y_{2,3}$ $Cb_{2,3}$ $Cr_{2,3}$ | $Y_{2,4}$ $Cb_{2,4}$ $Cr_{2,4}$ | $Y_{2,5}$ $Cb_{2,5}$ $Cr_{2,5}$ | ... |
| 3 | $Y_{3,0}$ $Cb_{3,0}$ $Cr_{3,0}$ | $Y_{3,1}$ $Cb_{3,1}$ $Cr_{3,1}$ | $Y_{3,2}$ $Cb_{3,2}$ $Cr_{3,2}$ | $Y_{3,3}$ $Cb_{3,3}$ $Cr_{3,3}$ | $Y_{3,4}$ $Cb_{3,4}$ $Cr_{3,4}$ | $Y_{3,5}$ $Cb_{3,5}$ $Cr_{3,5}$ | ... |
| 4 | $Y_{4,0}$ $Cb_{4,0}$ $Cr_{4,0}$ | $Y_{4,1}$ $Cb_{4,1}$ $Cr_{4,1}$ | $Y_{4,2}$ $Cb_{4,2}$ $Cr_{4,2}$ | $Y_{4,3}$ $Cb_{4,3}$ $Cr_{4,3}$ | $Y_{4,4}$ $Cb_{4,4}$ $Cr_{4,4}$ | $Y_{4,5}$ $Cb_{4,5}$ $Cr_{4,5}$ | ... |
| 5 | $Y_{5,0}$ $Cb_{5,0}$ $Cr_{5,0}$ | $Y_{5,1}$ $Cb_{5,1}$ $Cr_{5,1}$ | $Y_{5,2}$ $Cb_{5,2}$ $Cr_{5,2}$ | $Y_{5,3}$ $Cb_{5,3}$ $Cr_{5,3}$ | $Y_{5,4}$ $Cb_{5,4}$ $Cr_{5,4}$ | $Y_{5,5}$ $Cb_{5,5}$ $Cr_{5,5}$ | ... |
| ⋮ | ⋮ | ⋮ | ⋮ | ⋮ | ⋮ | ⋮ | ... |

FIG. 1 (PRIOR ART)

| $Y_{0,0}$ $Cb_{0,0}$ $Cr_{0,0}$ | $Y_{0,1}$ | $Y_{0,2}$ $Cb_{0,2}$ $Cr_{0,2}$ | $Y_{0,3}$ | $Y_{0,4}$ | $Y_{0,5}$ $Cb_{0,5}$ $Cr_{0,5}$ | ... |
|---|---|---|---|---|---|---|
| $Y_{1,0}$ | $Y_{1,1}$ | $Y_{1,2}$ | $Y_{1,3}$ | $Y_{1,4}$ | $Y_{1,5}$ | ... |
| $Y_{2,0}$ $Cb_{2,0}$ $Cr_{2,0}$ | $Y_{2,1}$ | $Y_{2,2}$ $Cb_{2,2}$ $Cr_{2,2}$ | $Y_{2,3}$ | $Y_{2,4}$ | $Y_{2,5}$ $Cb_{2,5}$ $Cr_{2,5}$ | ... |
| $Y_{3,0}$ | $Y_{3,1}$ | $Y_{3,2}$ | $Y_{3,3}$ | $Y_{3,4}$ | $Y_{3,5}$ | ... |
| $Y_{4,0}$ $Cb_{4,0}$ $Cr_{4,0}$ | $Y_{4,1}$ | $Y_{4,2}$ $Cb_{4,2}$ $Cr_{4,2}$ | $Y_{4,3}$ | $Y_{4,4}$ | $Y_{4,5}$ $Cb_{4,5}$ $Cr_{4,5}$ | ... |
| $Y_{5,0}$ | $Y_{5,1}$ | $Y_{5,2}$ | $Y_{5,3}$ | $Y_{5,4}$ | $Y_{5,5}$ | ... |
| ⋮ | ⋮ | ⋮ | ⋮ | ⋮ | ⋮ | ... |

FIG. 2 (PRIOR ART)

|   | 0 | 1 | 2 | 3 | 4 | 5 | ... |
|---|---|---|---|---|---|---|---|
| 0 | $Y_{0,0}$ $Cb_{0,0}$ $Cr_{0,0}$ | $Y_{0,1}$ ? | $Y_{0,2}$ $Cb_{0,2}$ $Cr_{0,2}$ | $Y_{0,3}$ ? | $Y_{0,4}$ $Cb_{0,4}$ $Cr_{0,4}$ | $Y_{0,5}$ ? | ... |
| 1 | $Y_{1,0}$ ? | $Y_{1,1}$ ? | $Y_{1,2}$ ? | $Y_{1,3}$ ? | $Y_{1,4}$ ? | $Y_{1,5}$ ? | ... |
| 2 | $Y_{2,0}$ $Cb_{2,0}$ $Cr_{2,0}$ | $Y_{2,1}$ ? | $Y_{2,2}$ $Cb_{2,2}$ $Cr_{2,2}$ | $Y_{2,3}$ ? | $Y_{2,4}$ $Cb_{2,4}$ $Cr_{2,4}$ | $Y_{2,5}$ ? | ... |
| 3 | $Y_{3,0}$ ? | $Y_{3,1}$ ? | $Y_{3,2}$ ? | $Y_{3,3}$ ? | $Y_{3,4}$ ? | $Y_{3,5}$ ? | ... |
| 4 | $Y_{4,0}$ $Cb_{4,0}$ $Cr_{4,0}$ | $Y_{4,1}$ ? | $Y_{4,2}$ $Cb_{4,2}$ $Cr_{4,2}$ | $Y_{4,3}$ ? | $Y_{4,4}$ $Cb_{4,4}$ $Cr_{4,4}$ | $Y_{4,5}$ ? | ... |
| 5 | $Y_{5,0}$ ? | $Y_{5,1}$ ? | $Y_{5,2}$ ? | $Y_{5,3}$ ? | $Y_{5,4}$ ? | $Y_{5,5}$ ? | ... |
| ⋮ | ⋮ | ⋮ | ⋮ | ⋮ | ⋮ | ⋮ | ... |

FIG. 3 (PRIOR ART)

COLOR IMAGE ENHANCEMENT DURING YCBCR TO RGB COLOR CONVERSION

BACKGROUND OF THE INVENTION

1. Field of the Invention

The present invention is related to the field of upsampling a color image that is being received in compressed YCbCr format.

2. Description of the Related Art

Images are converted to data for storage and transmission. Before being converted, an image is typically first split up into picture elements, also known as pixels.

Referring particularly to FIG. 1, a horizontal edge 12 of an image meets with the vertical edge 14 of the image at a corner 16. The image is split into horizontal rows numbered 0, 1, 2, . . . along the vertical edge 14, and vertical columns numbered 0, 1, 2, . . . along the horizontal edge 12. The rows and the columns define a grid, or matrix of pixels, each of which is identified by the number of its row and the number of its column. The pixels are designed to be of such small area, that each pixel is considered to have a single, uniform color. That single color, then, is converted into data.

The color of each pixel is converted to data according to conventions that are known as color spaces. Once the color space is chosen, the color is ultimately represented by data having numerical values within the chosen color space. The data is identified by the number of the row and the number of the column of the pixel.

A color space that is very useful for transmission of color images is the luminance/chrominance representation. Each color is represented by a luminance component Y, having a luminance value, and a chrominance component. The chrominance component is typically represented by two coefficients, the Cb coefficient and Cr coefficient.

As seen in FIG. 1, therefore, each pixel (i,j) is characterized by the values of the luminance component and the chrominance components. More specifically, that means a set of values $Y_{i,j}$, $Cb_{i,j}$, and $Cr_{i,j}$.

When it is required to transmit the image, therefore, the luminance and chrominance data is typically transmitted. Transmission can be faster if some data is omitted. A number of compression techniques delete data selectively, so that fewer values have to be transmitted, while making it possible to reconstruct the image with high fidelity afterwards. Such compression is also known as subsampling. Subsampling always results in some loss of image detail.

Referring now to FIG. 2, subsampled data is shown for transmitting the image of FIG. 1. According to the compression scheme of FIG. 2, also known as MPEG-2 YCbCr 4:2:0, much of the chrominance data of FIG. 1 is omitted in FIG. 2. In particular, only one in every four pairs of chrominance coefficients is transmitted. The transmitted values are shown in FIG. 2 as being in a matrix for simplicity only, while in fact they are transmitted serially for each pixel.

Referring now to FIG. 3, the reconstruction problem is demonstrated. The values of FIG. 2, after being received, are arranged in a matrix. In particular, a horizontal edge 32 is set up to meet a vertical edge 34 at a corner 36. Then the rows and columns are defined, and numbered similarly to those of FIG. 1.

The chrominance values that were not transmitted are now missing, and are shown with question marks "?" in FIG. 3. As such, values must be generated where there are question marks, so that the pixel colors can be replicated. Generating such values is also known as upsampling or expanding.

A number of techniques are known in the prior art for upsampling. The simplest technique is simple replication, i.e. setting the values of ($Cb_{1,0}$, $Cr_{1,0}$), ($Cb_{0,1}$, $Cr_{0,1}$) and ($Cb_{1,1}$, $Cr_{1,1}$) as equal to the received ($Cb_{0,0}$, $Cr_{0,0}$). While computationally simple, the technique results in a dull image. More complex filtering techniques may be applied to perform upsampling, but these can introduce loss of image detail in addition to that produced during the initial subsampling.

After upsampling, the image data can be converted to color data in a different color space. A typical color space is the red, green, blue (RGB) color space, also used by color television. For some applications, a high color contrast output image is desirable for presentation to the viewer, as for example in a television receiver. Many techniques have been proposed for color transient improvement. The best current techniques must be applied separately to the red, green, and blue color channels, to prevent the creation of undesirable effects called color artifacts. These require three separate sets of computations to be performed independently, namely one for each of the three color channels. Worse, these are done on full resolution data, which is the most time-consuming. What is desired is a method that improves the image with reduced computation requirements.

BRIEF SUMMARY OF THE INVENTION

The present invention overcomes these problems and limitations of the prior art.

Generally, the present invention provides a method for upsampling a received YCbCr signal, by generating the missing chrominance values. By operating only on the YCbCr signal, the method of the invention does not require computations on three color channels.

The method of invention generates chrominance coefficients for each individual pixel. In so doing, the method of invention takes into account the values of the chrominance coefficients actually received for a neighboring pixel. Importantly, it also accounts for the values of the luminance of the pixel, and of the saturation value for chrominance coefficients, as determined by the value of the luminance of the pixel.

Since different chrominance coefficients are generated for each pixel, large areas of the reconstructed image appear as having a texture. This enhances the image, and is pleasing for images of natural objects.

The foregoing and other objects, features and advantages of the invention will become more readily apparent from the following detailed description of a preferred embodiment, which proceeds with reference to the drawings.

BRIEF DESCRIPTION OF THE DRAWINGS

FIG. 1 is a prior art depiction of how an image is decomposed into a rectangular matrix of pixels, and how to color of each pixel is represented by values, and how these values are assigned coordinate numbers within the matrix.

FIG. 2 is a depiction of only those values of FIG. 1 that are actually transmitted according to a YCbCr compression scheme.

FIG. 3 is a table illustrating the problem of replication of values that must take place for adding to the values of FIG. 2, in order to reconstruct a replica of the full values of FIG. 1.

DETAILED DESCRIPTION OF THE PREFERRED EMBODIMENT(S)

As has been mentioned, the present invention provides a method for generating the missing chrominance values. The method is particularly useful for systems that receive a signal in the luminance chrominance color space, and convert it to the RGB color space. The method of the invention is now described in more detail.

The method of invention will be repeated for all pixels that lack a chrominance value.

Figure 4:
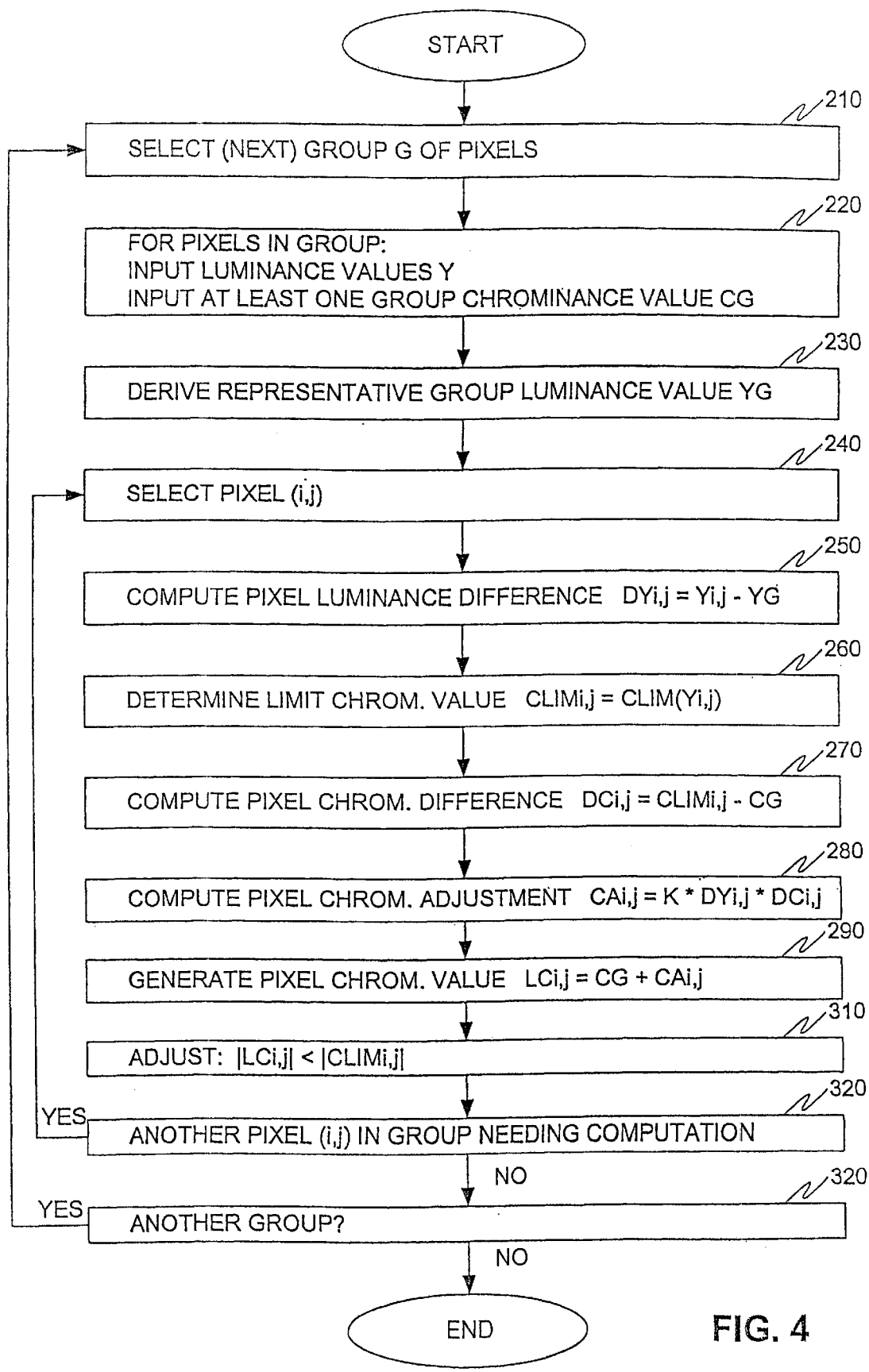
FIG. 4 is a flowchart illustrating a method according to the invention.

Referring now to FIG. 4, according to a first box 210, a next group G of pixels is selected. The idea is that the selected pixel, i.e. the pixel for which the chrominance component will be computed, is part of the group. The group can be any size that is found convenient. It is preferred that the group is defined such that only one chrominance value has been received for its pixels. It is also preferred that the group is chosen such that its pixels are neighboring, so that the single received chrominance value applies to all of them as much as possible.

For the method of FIGS. 1, 2 and 3, the preferred group comprises four neighboring pixels arranged at the points of a square. For example, one group G can be the pixels (0,0), (0,1), (1,0), (1,1). Other options are possible, for example a group of two pixels, such as for a different compression scheme.

According to a second box 220, a group chrominance value CG for the pixels in the group is obtained. In general the group chrominance value CG has a Cb component CGb and a Cr component CGr. For the group of the above chosen example, the group chrominance value is defined to be the received pair of values for the coefficients $Cb_{0,0}$ and $Cr_{0,0}$. This means that the method of invention will only be performed for the 3 pixels of the group for which the pair of chrominance coefficients was not received.

Further according to box 220, luminance values Y are obtained. For the method of invention, at least one luminance value $Y_{i,j}$ corresponding to the selected pixel must be inputted. In the example discussed herein, one luminance value is received for each pixel in the group. This means inputting $Y_{0,0}$, $Y_{0,1}$, $Y_{1,0}$ and $Y_{1,1}$.

According to a next box 230, a group luminance value YG is obtained in dependence upon at least two of the inputted luminance values of the group. It is preferred that the group luminance value YG is computed as the arithmetic mean of the luminance values of the pixels in the group. The same can be described in the following equation (1):

$$YG = \frac{Y_{0,0} + Y_{0,1} + Y_{1,0} + Y_{1,1}}{4} \tag{1}$$

As will be appreciated, other, simpler methods are also possible. For example, deriving the group luminance value is performed by selecting the luminance value of a pixel close to the selected pixel.

According to a next box 240, a pixel is selected. The remainder of the method proceeds for each one of the pixels in the group that need the chrominance coefficient to be computed.

According to a next box 250, a pixel luminance value difference DYi,j is computed. The difference DYi,j is that of the group luminance value YG from the inputted luminance value Yi,j. More specifically, $$DYi,j = Y_{i,j} - YG \tag{2}$$

Another important part of the invention is described in box 260. A limit saturation chrominance value CLIMi,j is determined, in dependence upon at least one of the inputted luminance values $Y_{i,j}$. More specifically, $$CLIMi,j = CLIM(Y_{i,j}, \ldots) \tag{3}$$

As will be appreciated from the below, there are also other factors for solving equation (3), such as the local chrominance value. Moreover, equation (3) is a general form for determining the saturation (or limit) of the two coefficients Cb and Cr, namely CbLIMi,j and CrLIMi,j. More particularly, equation (3) is a general form for equations (4) and (5):

$$CbLIMi,j = CbLIM(Y_{i,j}, \ldots) \tag{4}$$

$$CrLIMi,j = CrLIM(Y_{i,j}, \ldots) \tag{5}$$

Figure 5:
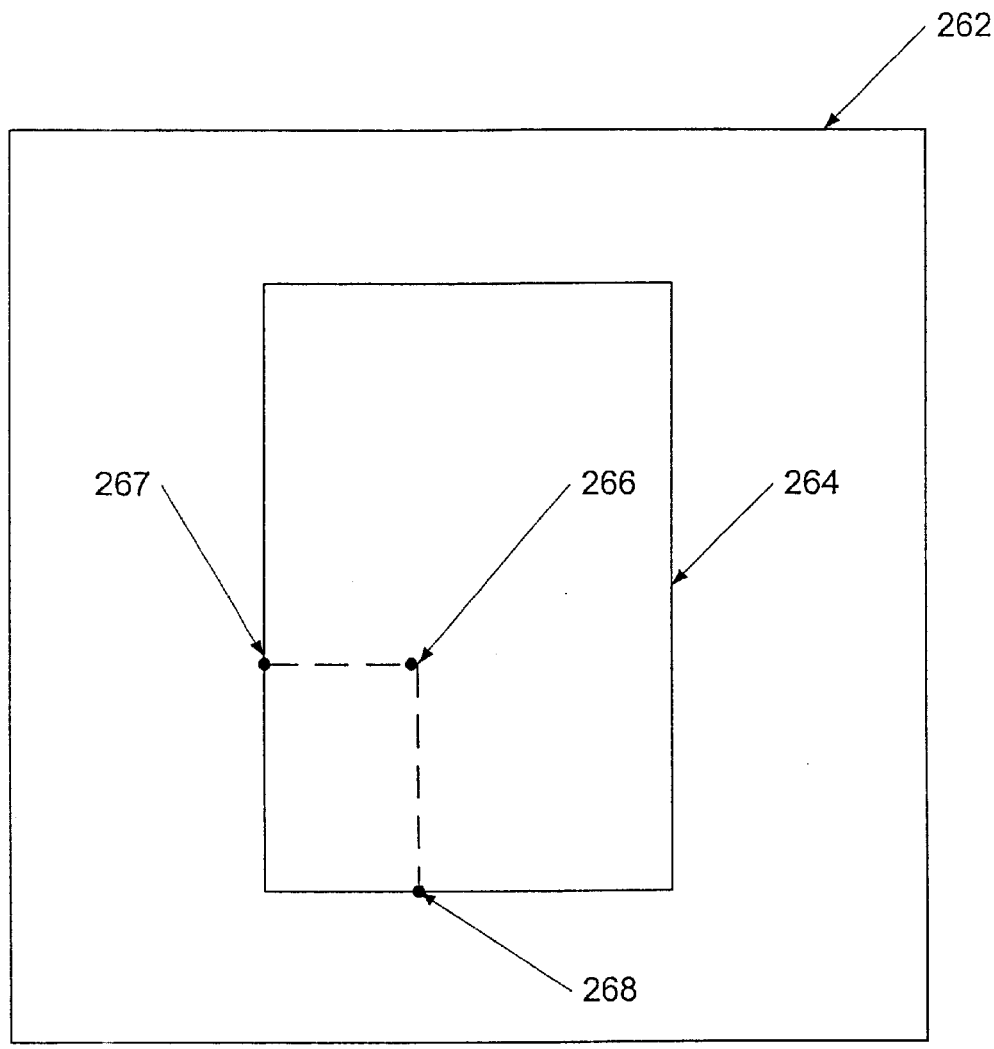
FIG. 5 is a diagram illustrating relative relationships of two color spaces.

The concept of equations (3), (4), and (5) is now explained also with a brief reference to FIG. 5. To understand the concept of saturation of color difference values, it is best to consider the relationship between the YCbCr and RGB color spaces. Each color space can be thought of as a cube, with one component along each of the principal axes of the cube. The YCbCr cube is larger than, and wholly contains, the RGB cube. The RGB cube is aligned with the (0,0,0)–(255,255,255) RGB vector coincident with the (16, 16,16)–(235,240,240) vector of the YCbCr cube.

Because of the mathematical relationship between the two color spaces, all RGB values can be represented by equivalent YCbCr values, but the converse is not true. For any given Y value, there is a valid range of Cb and Cr values that correspond to physically realizable RGB values. However, values of Cb and Cr outside the RGB color cube correspond to RGB color component values that are negative, or greater than 255, and thereby produce physically not realizable color values. The boundary of the Cb and Cr values between the realizable and the not realizable are called the limit saturation values.

Referring to FIG. 5, the relative values are shown for the value of Y=128 in a two-dimensional fashion. The outer box 262 represents the Cb and Cr values. Cb increases from left to right (−128 to 128), while Cr increases from bottom to top (−128 to 128). Box 264 represents the allowable values in the RGB color space.

As can be seen, only a limited range of pairs of Cb and Cr produce valid RGB colors, as determined by the RGB boundary 264 at that luminance value. Importantly, the edges of box 264 are the limit situation values. It will be appreciated that a point 266, having a luminance of Y=128, has a limit Cb value given by line 267, and a limit Cr value given by line 268.

It will be further appreciated that any of the inputted luminance values can be used to compute the limit saturation chrominance value. This includes also a derived luminance value, such as the group luminance value YG. It is preferred that the limit saturation chrominance value is determined in dependence upon the luminance value that corresponds to the selected pixel.

In the preferred embodiment, the limit saturation chrominance value is represented by a limit Cb coefficient and a limit Cr coefficient. The limit Cb coefficient (CbLIMij) is determined in dependence upon the group Cr coefficient and the luminance value that corresponds to the selected pixel. The limit Cr coefficient (CrLIMij) is determined in dependence upon the group Cb coefficient and the luminance value that corresponds to the selected pixel. In other words, each of the inputted chrominance coefficients helps determine the other.

According to the invention, the limit saturation chrominance coefficients can be computed as necessary. In another embodiment, they are precomputed and stored in a memory of the device as a lookup table of luminance values and corresponding limit saturation chrominance values. In that case, determining the limit saturation chrominance value is performed by looking up the generated lookup table from the inputted luminance value corresponding to the selected pixel (i,j).

It is understood that the boxes of FIG. 5 are for only one, sample value of luminance. For a different value of the luminance, another, typically different box would represent the corresponding limit saturation chrominance values.

Returning to FIG. 4, according to a next box 270, a chrominance value difference DCij is computed. The following equation is used:

$$DCi,j = CLIMi,j - CG \quad (6)$$

In other words, the chrominance value difference DCi,j is between the limit saturation chrominance value and the group chrominance value. Again, equation (6) is an abstraction for the equations for computing the two chrominance difference coefficients DCb and DCr. More particularly, equation (6) is the general form for equations (7) and (8) below:

$$DCb_{i,j} = CbLIMi,j - CGb \quad (7)$$

$$DCr_{i,j} = CrLIMi,j - CGr \quad (8)$$

According to a next box 280, a pixel chrominance adjustment CAi,j is computed. This is performed according to equation (9) below:

$$CAi,j = K * DYi,j * DCi,j \quad (9)$$

Again, equation (9) is an abstraction for the equations for computing the two chrominance adjustments CACb and CACr. More particularly, equation (9) is the general form for equations (10) and (11) below:

$$CACb_{i,j} = KCb * DY_{i,j} * DCb_{i,j} \quad (10)$$

$$CACr_{i,j} = KCr * DY_{i,j} * DCr_{i,j} \quad (11)$$

In equations (9), (10), (11), the factors K, KCb, KCr respectively are a numerical constant. It is highly advantageous that these numerical constants include the group luminance value YG in the denominator. More particularly, $$KCb = ACb/YG \quad (12)$$

$$KCr = ACr/YG \quad (13)$$

As such, the factors ACb and ACr are convenient scaling factors. It is found that values for these scaling factors that work well are: ACb=ACr=6.

According to a next box 290, a chrominance value LCi,j is computed. This is performed according to equation (14) below:

$$LCi,j = CG + CAi,j \quad (14)$$

That is, the group chrominance value is used as a baseline, and a method of invention computes adjustments to the baseline. Again, equation (14) is an abstraction for the equations for computing the two chrominance coefficients LCb and LCr. More particularly, equation (14) is the general form for equations (15) and (16) below:

$$LCb_{i,j} = CGb + CACb_{i,j} \quad (15)$$

$$LCr_{i,j} = CGr + CACr_{i,j} \quad (16)$$

Another, optional step according to the invention is depicted in box 310. The resulting coefficients are checked to ensure that they still belong within the saturation limits. If not, the generated values are adjusted to belong within the saturation limits. More particularly, it is determined whether an absolute value of the generated chrominance value is larger than an absolute value of the determined limit saturation chrominance for the selected pixel. If that is so, the generated chrominance value for the selected pixel is adjusted to decrease the absolute value of the generated chrominance value for the selected pixel. This is also expressed in equations (17) and (18).

$$|LCb_{i,j}| = < |CbLIMi,j| \quad (17)$$

$$|LCr_{i,j}| = < |CrLIMi,j| \quad (18)$$

According to a next box 320, it is determined whether another pixel in the group needs its chrominance coefficients computed. If yes, execution returns to box 240. If no, execution proceeds to box 330. There it is inquired whether another group is to be processed. If yes, execution returns to box 210. If no, execution ends.

A person skilled in the art will be able to practice the present invention in view of the present description, where numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. Applicant regards the subject matter of the invention to include all combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related application for patent.

The invention claimed is:

1. A method for generating a chrominance value for a selected pixel, comprising:

selecting a group of pixels that includes the selected pixel;

inputting one luminance value corresponding to the selected pixel;

obtaining a group luminance value in dependence upon at least the inputted luminance value;

computing a luminance value difference of the group luminance value from the inputted luminance value corresponding to the selected pixel;

determining a limit saturation chrominance value in dependence upon at least the inputted luminance value;

obtaining a group chrominance value for the group of pixels;

computing a chrominance value difference between the limit saturation chrominance value and the group chrominance value;

multiplying a numerical constant with the computed luminance value difference and with the computed chrominance value difference to derive a chrominance adjustment; and adding the chrominance adjustment to the group chrominance value to generate a chrominance value for the selected pixel.

2. The method of claim 1, wherein the numerical constant includes the group luminance value in the denominator.

3. The method of claim 1, wherein deriving the group luminance value comprises:

inputting one luminance value corresponding to each of the remaining pixels in the group, and computing the arithmetic mean of the luminance values of the pixels of the group to derive the group luminance value.

4. The method of claim 3, wherein the numerical constant includes the group luminance value in the denominator.

5. The method of claim 1, further comprising:

determining whether an absolute value of the generated chrominance value is larger than an absolute value of the determined limit saturation chrominance for the selected pixel, and if so, adjusting the generated chrominance value for the selected pixel to decrease the absolute value of the generated chrominance value for the selected pixel.

6. The method of claim 5, wherein the numerical constant includes the group luminance value in the denominator.

7. The method of claim 1, further comprising:

generating a lookup table of luminance values and corresponding limit saturation chrominance values, and wherein determining the limit saturation chrominance value is performed by looking up the generated lookup table from the inputted luminance value corresponding to the selected pixel.

8. The method of claim 7, wherein the numerical constant includes the group luminance value in the denominator.

9. The method of claim 1, wherein the limit saturation chrominance value is determined further in dependence upon the group chrominance value.

10. The method of claim 9, wherein the numerical constant includes the group luminance value in the denominator.

11. The method of claim 9, wherein the group chrominance value is represented by at least a group Cb coefficient and a group Cr coefficient, and the limit saturation chrominance value is represented by a limit Cb coefficient that is determined in dependence upon the group Cr coefficient, and an RGB boundary that depends on the luminance value that corresponds to the selected pixel, and a limit Cr coefficient that is determined in dependence upon the group Cb coefficient, and an RGB boundary that depends on the luminance value that corresponds to the selected pixel.

12. The method of claim 11, wherein the numerical constant includes the group luminance value in the denominator.

13. The method of claim 1, wherein deriving the group luminance value is performed by selecting the luminance value corresponding to a pixel close to the selected pixel.

14. The method of claim 13, wherein the numerical constant includes the group luminance value in the denominator.

15. The method of claim 1, wherein the group comprises four neighboring pixels arranged at the points of a square.

16. The method of claim 15, wherein the numerical constant includes the group luminance value in the denominator.

17. The method of claim 1, wherein deriving the group luminance value comprises:

inputting one luminance value corresponding to each of the remaining pixels in the group, and computing the arithmetic mean of the luminance values of the pixels of the group.

18. The method of claim 17, wherein the numerical constant includes the group luminance value in the denominator.

19. The method of claim 15, further comprising:

determining whether an absolute value of the generated chrominance value is larger than an absolute value of the determined limit saturation chrominance for the selected pixel, and if so, adjusting the generated chrominance value for the selected pixel to decrease the absolute value of the generated chrominance value for the selected pixel.

20. The method of claim 19, wherein the numerical constant includes the group luminance value in the denominator.

21. The method of claim 15, further comprising:

generating a lookup table of luminance values and corresponding limit saturation chrominance values, and wherein determining the limit saturation chrominance value is performed by looking up the generated lookup table from the inputted luminance value corresponding to the selected pixel.

22. The method of claim 21, wherein the numerical constant includes the group luminance value in the denominator.

23. The method of claim 15, wherein the limit saturation chrominance value is determined further in dependence upon the group chrominance value.

24. The method of claim 23, wherein the numerical constant includes the group luminance value in the denominator.

25. The method of claim 23, wherein the group chrominance value is represented by at least a group Cb coefficient and a group Cr coefficient, and the limit saturation chrominance value is represented by a limit Cb coefficient that is determined in dependence upon the group Cr coefficient, and an RGB boundary that depends on the luminance value that corresponds to the selected pixel, and a limit Cr coefficient that is determined in dependence upon the group Cb coefficient, and an RGB boundary that depends on the luminance value that corresponds to the selected pixel.

26. The method of claim 25, wherein the numerical constant includes the group luminance value in the denominator.

* * * * *